US008583950B2

(12) United States Patent
Luo et al.

(10) Patent No.: US 8,583,950 B2
(45) Date of Patent: Nov. 12, 2013

(54) POWER SUPPLY CIRCUIT FOR A CPU

(75) Inventors: Qi-Yan Luo, Shenzhen (CN); Song-Lin Tong, Shenzhen (CN); Ya-Jun Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 435 days.

(21) Appl. No.: 13/090,469

(22) Filed: Apr. 20, 2011

(65) Prior Publication Data

US 2012/0185705 A1    Jul. 19, 2012

(30) Foreign Application Priority Data

Jan. 13, 2011    (CN) .......................... 2011 1 0006933

(51) Int. Cl.
*G06F 1/26*    (2006.01)
(52) U.S. Cl.
USPC ....................................................... 713/320
(58) Field of Classification Search
None
See application file for complete search history.

(56) References Cited

U.S. PATENT DOCUMENTS

| 4,898,464 | A | * | 2/1990 | Thorne et al. ............. 356/139.09 |
| 5,166,870 | A | * | 11/1992 | Shimizu et al. .................. 363/41 |
| 6,009,005 | A | * | 12/1999 | Kim ................................ 363/95 |
| 7,412,613 | B2 | * | 8/2008 | Park ............................. 713/320 |

OTHER PUBLICATIONS

Wikipedia, Rectifier, Feb. 16, 2010, Wikipedia.*
Wikipedia, Voltage divider, Feb. 23, 2010, Wikipedia.*
Marcel Dekker, Rectiifier Power Factor and Pulse-Width Modulation Controlled Rectifier Circuits, 2004, Marcel Dekker Inc., Ch 8.*
Sliding Mode Control in Electro-Mechanical Systems, 2009, Taylor & Francis Group LLC, Ch 11 Power Converters.*
Three-Phase, Pulse-Width Modulation, Controlled Inverter Circuits, 2004, Marcel Dekker Inc, Ch 11.*

* cited by examiner

*Primary Examiner* — Kim Huynh
*Assistant Examiner* — Austin Hicks
(74) *Attorney, Agent, or Firm* — Altis & Wispro Law Group, Inc.

(57) ABSTRACT

A power supply circuit for a CPU (central processing unit) includes a CPU, a power supply, a plurality of voltage adjustment modules, a pulse width modulator, a plurality of resistivity selection modules, and a module management unit. The resistivity selection module includes an electronic switch, a first resistor, a second resistor, a third resistor, and a fourth resistor. When the CPU operates abnormally, the power supply circuit utilizes the resistors in the resistivity selection module as voltage dividers, thereby restricting MOSFET or other components to operate in a normal voltage range.

4 Claims, 3 Drawing Sheets

POWER SUPPLY CIRCUIT FOR A CPU

BACKGROUND

1. Technical Field

The present disclosure relates to a power supply circuit for a CPU (central processing unit).

2. Description of Related Art

With progress in computer techniques, the number of working phases of power supply circuits for a CPU has increased from one to four or more. For example, INTEL VR12 has four operating modes, PS0, PS1, PS2 and PS3. In mode PS0, the power supply circuit for a CPU operates in all working phases simultaneously to provide more current to the CPU. The number of working phases on which the power supply circuit for a CPU operates decreases with increase in PS modes.

Generally, a power supply circuit supplies current to a CPU based on an operating mode signal sent to a Pulse-Width Modulator (PWM) from the CPU, enabling the power supply circuit to operate in an adequate number of working phases. The current in the entire circuit is the sum of each working phase. Hence, the amount of current increases with the number of working phases on which the power supply circuit operates. In addition, generally, a power supply circuit for a CPU has an excessive current prevention circuit merely for the PS0 mode (that is, the mode which enables CPU to operate in all working phases).

When operating abnormally, a CPU can output an operating mode signal which not corresponds to the operating mode of the CPU to the pulse width modulator. For instance, outputting an operating mode signal corresponding to operating mode PS1, PS2 or PS3 when the CPU operates in mode PS0. Consequently, when receiving the operating mode signal, the pulse width modulator decreases the number of working phases on which the power supply circuit operates to three phases, two phases or one phase while the CPU still operates in mode PS0. In other words, the amount of current in the power supply circuit for a CPU equals that when the CPU still operates in mode PS0 (that is, the sum of the currents on four working phases). As a result, the current of each phase is increased, and the MOSFET or other components in the power supply circuit may be damaged. In addition, the excessive current prevention circuit of the power supply circuit for a CPU merely operates when receiving an operating mode signal corresponding to operating mode PS0 from the CPU. In sum, there is room for improvement.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
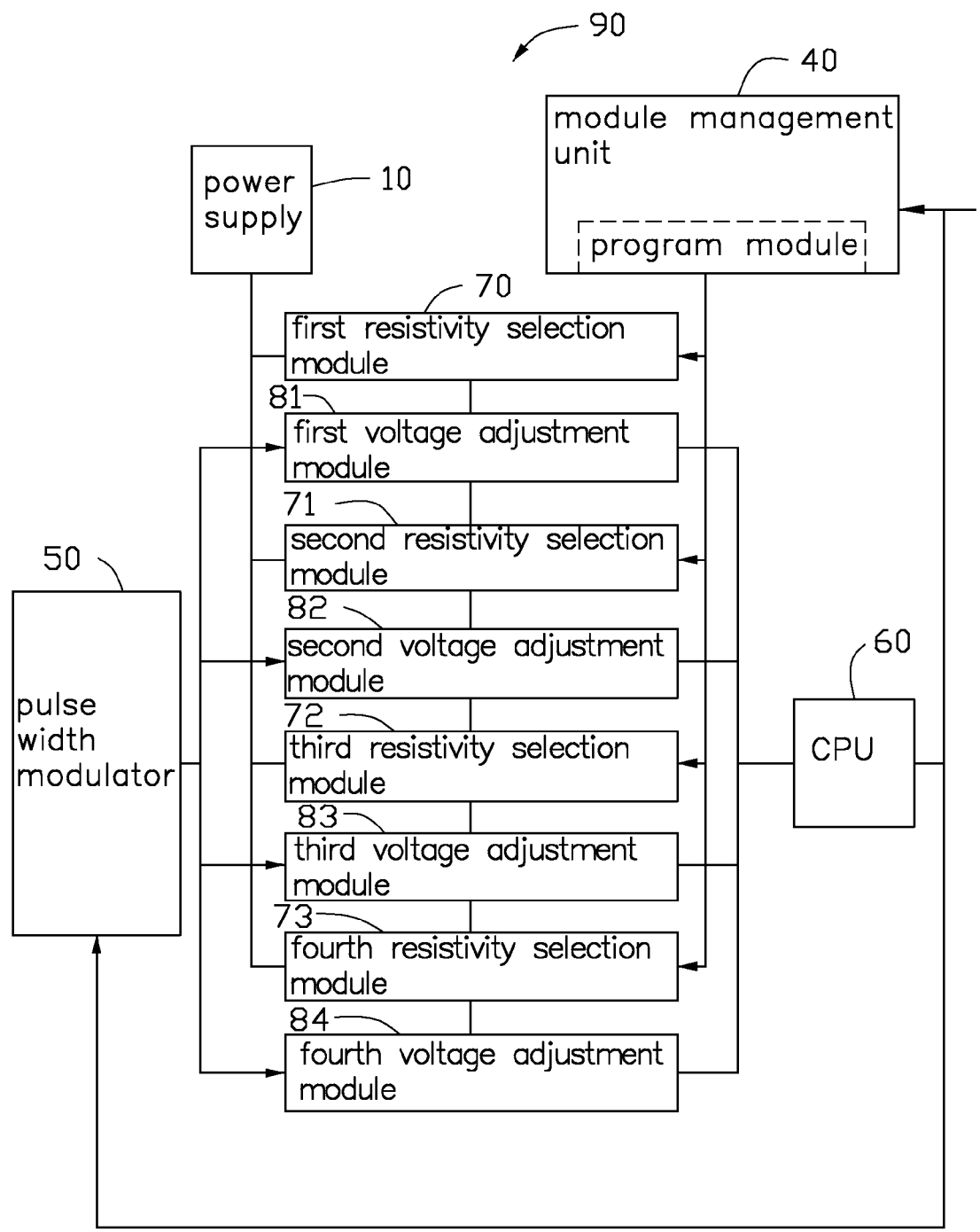
FIG. 1 is a block diagram of a preferred embodiment of the power supply circuit for a CPU of the present disclosure.

As shown in FIG. 1, a preferred embodiment of the power supply circuit for a CPU (central processing unit) 90 of the present disclosure includes a CPU 60, a pulse width modulator 50, a module management unit 40, a power supply 10, first resistivity selection modules 70, second resistivity selection modules 71, third resistivity selection modules 72, fourth resistivity selection modules 73, a first voltage adjustment module 81, a second voltage adjustment module 82, a third voltage adjustment module 83, and a fourth voltage adjustment module 84.

The module management unit 40 includes a program module connected to the CPU 60 and the first to the fourth resistivity selection modules 70-73. The module management unit 40 receives an operating mode signal from the CPU 60, and transforms the operating mode signal to a switch signal that can be identified by the first to the fourth resistivity selection modules 70-73.

The pulse width modulator 50 is connected to the CPU 60 and the first to the fourth voltage adjustment modules 81-84. The first to the fourth voltage adjustment modules 81-84 are further connected to the CPU 60. The pulse width modulator 50 changes the operation status of the first to the fourth voltage adjustment modules 81-84 in response to the operating mode signal received from the CPU 60. In other words, the pulse width modulator 50 changes the number of working phases of the power supply circuit, and enables the four voltage adjustment modules 81-84 to output a suitable voltage to the CPU 60.

The first to the fourth resistivity selection modules 70-73 are connected to the power supply 10. The first to the fourth resistivity selection modules 70-73 selects the resistivity for voltage division according to operating modes.

Figure 2:
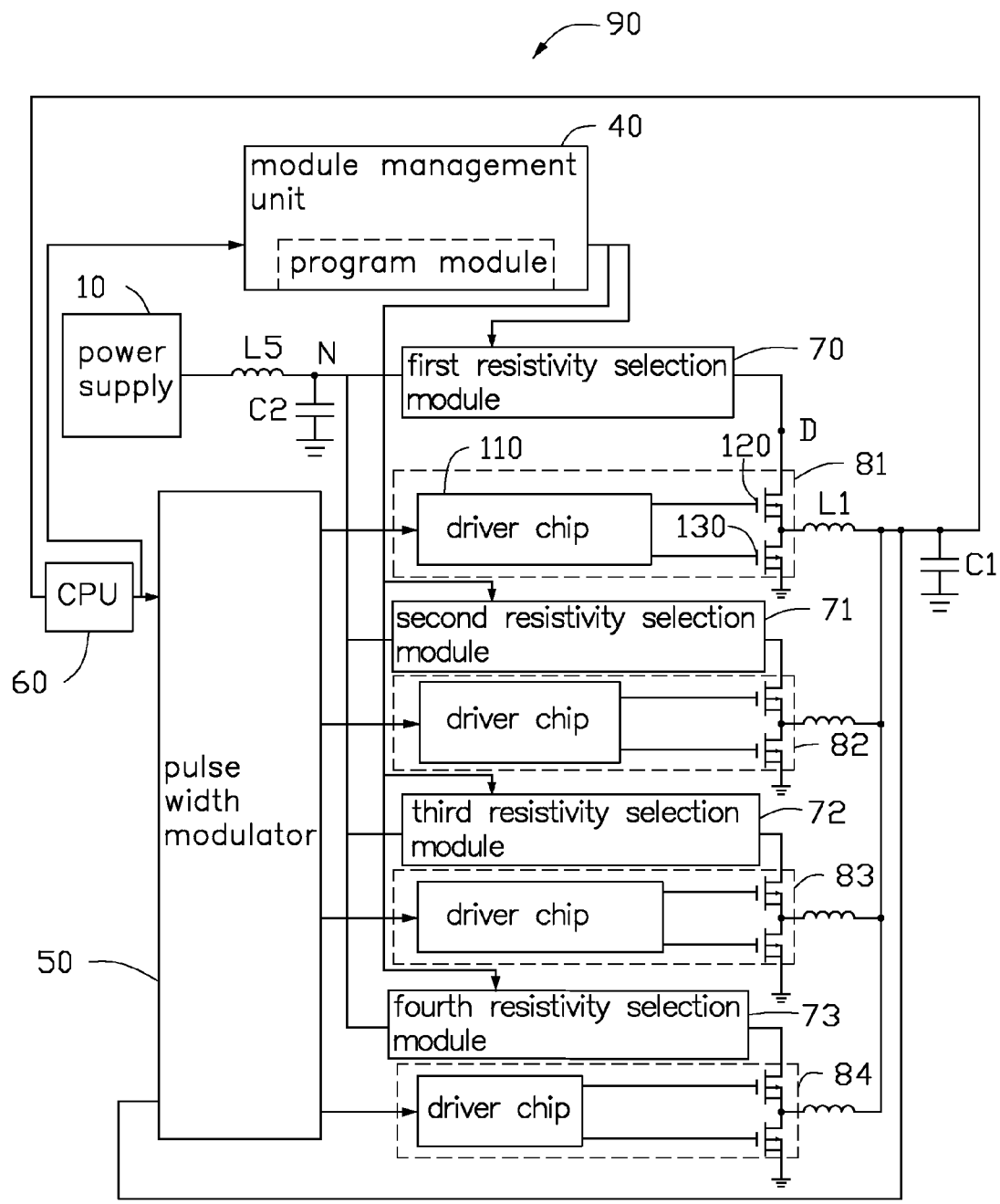
FIG. 2 is a circuit diagram of a preferred embodiment of the power supply circuit for a CPU of the present disclosure.

As shown in FIG. 2, the power supply 10 is connected to one terminal of an inductor L5. The other terminal of the inductor L5 is connected to one terminal of a capacitor C2, and the other terminal of the capacitor C2 is grounded. A node N between the inductor L5 and the capacitor C2 is connected to the first to the fourth resistivity selection modules 70-73.

The first voltage adjustment module 81 includes a driver chip 110, an upper bridge MOSFET 120, and a lower bridge MOSFET 130. The source of the upper bridge MOSFET 120 is directly connected to the drain of the lower bridge MOSFET 130, and connected to one terminal of an inductor L1. The other terminal of the inductor L1 is connected to a first terminal of the capacitor C1, and a second terminal of the capacitor C1 is grounded. The drain of the upper bridge MOSFET 120 is connected to the first resistivity selection module 70. The source of the lower bridge MOSFET 130 is grounded. The gates of the upper bridge MOSFET 120 and the lower bridge MOSFET 130 are connected to the driver chip 110. A node between the inductor L1 and the capacitor C1 is an output terminal of the power supply circuit connecting to the CPU 60. The first voltage adjustment module 81 provides adequate voltage to the CPU 60 through turning on/off the upper bridge MOSFET 120 and the lower bridge MOSFET 130 in turn. The structures of the second voltage adjustment module 82, the third voltage adjustment module 83, and the fourth voltage adjustment module 84 are identical to that of the first voltage adjustment module 81 as described and description of them are omitted.

Figure 3:
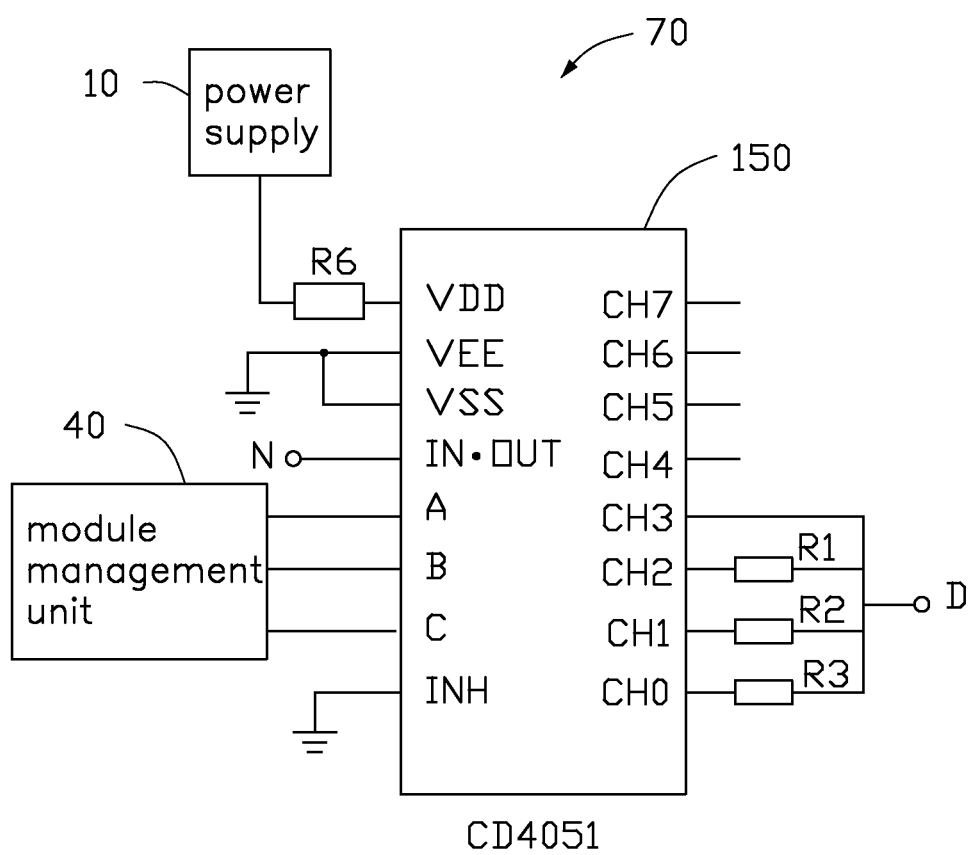
FIG. 3 is a circuit diagram of the first resistivity selection module of FIG. 2.

As shown in FIG. 3, the first resistivity selection module 70 includes an electronic switch 150 (e.g., a CD4051 chip), resistors R1, R2, R3, and R6. The current input terminal IN.OUT of the electronic switch 150 is connected to the node N between the capacitor C2 and the inductor L5. The signal input terminal A, B, and C are connected to the module management unit 40. The power source VDD is connected to the power supply 10 through the resistor R6. The inhibition terminal INH, the power terminal VEE and VSS are grounded. The output terminal CH3 of the electronic switch 150 is directly connected to the drain D of the upper bridge MOSFET 120. The other output terminals CH4-CH7 of the electronic switch 150 are idle. The circuit structures of the second resistivity selection module 71, the third resistivity selection module 72, and the fourth resistivity selection module 73 is identical to that of the first resistivity selection module 70.

As shown in FIG. 2, if operating normally, the CPU 60 outputs an operating mode signal corresponding to mode PS0 to the pulse width modulator 50 and the module management unit 40 when the CPU 60 operates in mode PS0. The pulse width modulator 50 subsequently outputs four pulse signals to four driver chips 110, respectively. The four driver chips 110 output control signals to turn on/off the four sets of the upper bridge MOSFET and the lower bridge MOSFET in turn in response to the pulse signals. The module management unit 40 utilizes the program module to transform the operating mode signal corresponding to mode PS0 to a switch signal identifiable by the electronic switch 150. The electronic switch 150 of the first to the fourth resistivity selection modules 70-73 turns on the output terminal CH3 in response to the switch signal received from the module management unit 40, outputting the current input from the current input terminal IN.OUT to the first to the fourth voltage adjustment modules 81-84 directly. Consequently, since there is no voltage divider resistor, the prevention of excessive current is performed by the excessive current prevention circuit of original power supply circuit for a CPU. The first to the fourth voltage adjustment modules 81-84 adjust the voltages output to the CPU 60 through adjustment of the duration of the on/off states of the upper bridge MOSFET 120 and the lower bridge MOSFET 130. As a result, the power supply circuit for a CPU 90 operates in all phases. The amount of the current in the output terminal is the sum of the four working phases (that is, the sum of the number of the current output from the first to the fourth voltage adjustment modules 81-84).

The CPU 60 outputs an operating mode signal corresponding to mode PS1 to the pulse width modulator 50 and the module management unit 40 when the CPU 60 operates in mode PS1. The pulse width modulator 50 subsequently outputs three pulse signals to the first to the third voltage adjustment modules 81-83, respectively. The module management unit 40 outputs switch signals to the first to the third resistivity selection modules 70-72, enabling the electronic switch 150 of the first to the third resistivity selection modules 70-72 to turn on the output terminals CH2, thereby outputting the current input from the current input terminal IN.OUT to the first to the third voltage adjustment modules 81-83 from the output terminals CH2 through the resistors R1. As a result, the power supply circuit for a CPU 90 operates in three working phases, and the amount of current in the output terminal is the sum of that on three working phases.

When the CPU 60 operates in mode PS2 and PS3, the power supply circuit for a CPU 90 operates in two phases and one phase, respectively, and the amount of current in the output terminal is the sum of that of two phases and one phase, respectively.

When operating abnormally, the CPU 60 can output an operating mode signal not corresponding to the operating mode. For instance, the CPU 60 could output a signal for other operating modes (e.g. PS2) to the pulse width modulator 50 when the CPU 60 operates in mode PS0. Consequently, the pulse width modulator 50 correspondingly outputs two pulse signals to two of the driver chips 110 to enable the power supply circuit for a CPU 90 to operate in two working phases. That is, the third and the fourth voltage adjustment modules 83 and 84 are turned off. However, the CPU 60 still operates in mode PS0. In other words, the power supply circuit for a CPU 90 still provides the amount of the current which provided when the CPU 60 operates in all phases. As a result, the current through the first to the second voltage adjustment modules 81-82 increases. Simultaneously, the electronic switch 150 turns on the output terminal CH1 in response to the switch signal received from the module management unit 40, outputting the current input from the current input terminal IN.OUT to the first to the fourth voltage adjustment modules 81-84 through the second resistor R2. Consequently, damage to MOSFETs in the voltage adjustment modules caused by excessive current in each of the voltage adjustment modules is prevented through use of the resistor R2 as a voltage divider resistor.

The operations of the power supply circuit for a CPU 90 when the CPU 60 outputs an operating mode signal corresponding to mode PS1 and PS3 are similar to those of the power supply circuit for a CPU 90 when the CPU 60 outputs an operating mode signal corresponding to mode PS2 as disclosed, while the voltage divider resistor is respectively the first resistor R1 and the third resistor R3, respectively, when operating in mode PS1 and PS3, hence, the details are omitted.

The power supply circuit for a CPU 90 as disclosed performs voltage division through the resistors in the four resistivity selection modules 70-73. When the CPU operates abnormally, it restricts MOSFET or other components to operate in a normal voltage range. As a result, damage to MOSFET or other components by excessive current is prevented when the working phase of a circuit is reduced.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A power supply circuit for a CPU comprising:
    a CPU;
    a power supply;
    a plurality of voltage adjustment modules;
    a module management unit for receiving an operating mode signal from the CPU, and transforming the operating mode signal to a switch signal;
    a plurality of resistivity selection modules for receiving the switch signal, thereby selecting a voltage divider resistor; and
    a pulse width modulator for changing the operation status of the voltage adjustment modules, and enabling the voltage adjustment modules to provide adequate voltage to the CPU in response to the operating mode signal received from the CPU;
    the power supply is grounded through the first inductor and a first capacitor, a node between the first inductor and the first capacitor is connected to the resistivity selection modules;
    each of the resistivity selection modules includes an electronic switch, a first resistor, a second resistor, a third resistor, and a fourth resistor, a signal input terminal of the electronic switch is connected to the module management unit, a current input terminal of the electronic switch is connected to a node between the first capacitor and the first inductor, a first power source terminal is connected to the power supply through the fourth resistor, an inhibition terminal, a second power source terminal and a third power source terminal of the electronic switch are connected to the ground; wherein a first output terminal of the electronic switch is directly connected to the drain of the upper bridge MOSFET, a second output terminal, a third output terminal, and a fourth output terminal of the electronic switch are connected to the drain of the upper bridge MOSFET through the first resistor, the second resistor, and the third resistor, respectively, other four output terminals are idle.

2. The power supply circuit for a CPU of claim 1, wherein the module management unit includes a program module for transforming signal.

3. The power supply circuit for a CPU of claim 1, wherein each of the voltage adjustment modules includes a driver chip, a upper bridge MOSFET, and a lower bridge MOSFET, the driver chip outputs two control signals to turn on/off the upper bridge MOSFET and the lower bridge MOSFET in turn, thereby adjusting the voltage output by the voltage adjustment module.

4. The power supply circuit for a CPU of claim 3, wherein the source of the upper bridge MOSFET is directly connected to the drain of the lower bridge MOSFET, the source of the upper bridge MOSFET is grounded through a second inductor and a second capacitor, the drain of the upper bridge MOSFET is connected to the resistivity selection module corresponding to the voltage adjustment module, the source of the lower bridge MOSFET is grounded, the gates of the upper bridge MOSFET and the lower bridge MOSFET are connected to the driver chip, a node between the second inductor and the second capacitor is connected to the CPU.

* * * * *